US008996851B2

(12) United States Patent
Dolgunov et al.

(10) Patent No.: US 8,996,851 B2
(45) Date of Patent: Mar. 31, 2015

(54) HOST DEVICE AND METHOD FOR SECURELY BOOTING THE HOST DEVICE WITH OPERATING SYSTEM CODE LOADED FROM A STORAGE DEVICE

(75) Inventors: Boris Dolgunov, Ramat-Gan (IL); Reuven Elhamias, Kfar Vradim (IL); Ehud Cohen, Rehovot (IL)

(73) Assignee: SanDisk IL Ltd., Kfar Saba (IL)

( * ) Notice: Subject to any disclaimer, the term of this patent is extended or adjusted under 35 U.S.C. 154(b) by 784 days.

(21) Appl. No.: 12/853,924

(22) Filed: Aug. 10, 2010

(65) Prior Publication Data
US 2012/0042376 A1    Feb. 16, 2012

(51) Int. Cl.
G06F 9/44 (2006.01)
G06F 21/57 (2013.01)
G06F 21/72 (2013.01)
G06F 21/85 (2013.01)
G06F 21/12 (2013.01)

(52) U.S. Cl.
CPC .............. G06F 9/4406 (2013.01); *G06F 21/72* (2013.01); *G06F 21/85* (2013.01); *G06F 21/123* (2013.01); G06F 21/575 (2013.01)
USPC ............................... 713/2; 713/193; 713/164

(58) Field of Classification Search
CPC ......... G06F 9/00; G06F 15/177; G06F 21/85; G06F 21/72; G06F 21/123; G06F 9/4406; H04L 9/00
USPC .......................... 713/2, 193, 164; 714/30, 758
See application file for complete search history.

(56) References Cited

U.S. PATENT DOCUMENTS

| | | | |
|---|---|---|---|
| 5,379,431 A * | 1/1995 | Lemon et al. | 710/10 |
| 5,475,839 A * | 12/1995 | Watson et al. | 713/2 |
| 5,701,477 A | 12/1997 | Chejlava, Jr. | |
| 5,870,520 A * | 2/1999 | Lee et al. | 714/6.12 |
| 6,185,678 B1 | 2/2001 | Arbaugh et al. | |
| 6,425,079 B1 * | 7/2002 | Mahmoud | 713/2 |
| 6,601,166 B1 * | 7/2003 | Ayyar et al. | 713/2 |
| 6,625,729 B1 | 9/2003 | Angelo et al. | |
| 6,748,544 B1 * | 6/2004 | Challener et al. | 726/17 |
| 7,017,038 B1 * | 3/2006 | LaChance et al. | 713/2 |
| 7,065,654 B1 * | 6/2006 | Gulick et al. | 713/193 |
| 7,111,050 B2 * | 9/2006 | McAdams | 709/216 |
| 7,234,052 B2 * | 6/2007 | Lee et al. | 713/2 |

(Continued)

FOREIGN PATENT DOCUMENTS

WO    WO 00/21238    4/2000

OTHER PUBLICATIONS

Intel Corporation, "Mechanism for remapping post virtual machine memory pages", 2002.*

(Continued)

*Primary Examiner* — O. C. Vostal
(74) *Attorney, Agent, or Firm* — Brinks Gilson Lione (57) ABSTRACT

A host device and method for securely booting the host device with operating system code loaded from a storage device are provided. In one embodiment, a host device is in communication with a storage device having a private memory area storing boot loader code and a public memory area storing operating system code. The host device instructs the storage device to initiate a boot mode and receives the boot loader code from the storage device. The host device executes the boot loader code which performs a security check and executes the operating system code loaded from the storage device only if the security check is successful.

24 Claims, 7 Drawing Sheets

(56) References Cited

U.S. PATENT DOCUMENTS

| | | | |
|---|---|---|---|
| 7,251,725 B2* | 7/2007 | Loison et al. | 713/1 |
| 7,266,849 B1* | 9/2007 | Gregory et al. | 726/34 |
| 7,634,648 B2* | 12/2009 | Koyama et al. | 713/2 |
| 7,711,941 B2* | 5/2010 | Henry et al. | 713/1 |
| 7,779,273 B2* | 8/2010 | Dale et al. | 713/189 |
| 7,865,740 B2* | 1/2011 | Rudelic et al. | 713/193 |
| 8,032,181 B2* | 10/2011 | Hauck et al. | 455/558 |
| 8,135,945 B2* | 3/2012 | Gehrmann | 713/2 |
| 8,683,212 B2* | 3/2014 | Rodgers et al. | 713/187 |
| 8,856,544 B2* | 10/2014 | Bosch et al. | 713/187 |
| 2003/0009657 A1* | 1/2003 | French et al. | 713/2 |
| 2003/0018892 A1* | 1/2003 | Tello | 713/164 |
| 2004/0003288 A1 | 1/2004 | Wiseman et al. | |
| 2005/0044348 A1* | 2/2005 | O'Connell | 713/1 |
| 2005/0081071 A1* | 4/2005 | Huang et al. | 713/300 |
| 2005/0138423 A1* | 6/2005 | Ranganathan | 713/201 |
| 2006/0015717 A1* | 1/2006 | Liu et al. | 713/164 |
| 2006/0064752 A1 | 3/2006 | Wang et al. | |
| 2006/0155837 A1* | 7/2006 | Kobayashi et al. | 709/223 |
| 2006/0184794 A1* | 8/2006 | Desselle et al. | 713/166 |
| 2007/0061561 A1 | 3/2007 | Hashiguchi | |
| 2007/0067617 A1 | 3/2007 | Tarkkala | |
| 2007/0192610 A1 | 8/2007 | Chun et al. | |
| 2007/0235517 A1* | 10/2007 | O'Connor et al. | 235/375 |
| 2007/0239996 A1* | 10/2007 | Cromer et al. | 713/193 |
| 2008/0022134 A1* | 1/2008 | Wang | 713/193 |
| 2008/0065875 A1* | 3/2008 | Thompson | 713/2 |
| 2008/0077592 A1* | 3/2008 | Brodie et al. | 707/9 |
| 2008/0104381 A1* | 5/2008 | Peacock et al. | 713/1 |
| 2008/0162917 A1 | 7/2008 | McAvoy | |
| 2009/0049295 A1* | 2/2009 | Erickson et al. | 713/2 |
| 2009/0112823 A1 | 4/2009 | Aharonov et al. | |
| 2009/0193507 A1* | 7/2009 | Ibrahim | 726/9 |
| 2009/0204964 A1* | 8/2009 | Foley et al. | 718/1 |
| 2009/0282232 A1* | 11/2009 | Ugokwe | 713/2 |
| 2009/0300415 A1* | 12/2009 | Zhang et al. | 714/19 |
| 2010/0011200 A1* | 1/2010 | Rosenan | 713/2 |
| 2010/0011350 A1 | 1/2010 | Zayas | |
| 2010/0023743 A1* | 1/2010 | Sastry et al. | 713/2 |
| 2010/0070749 A1* | 3/2010 | Tsai | 713/2 |
| 2010/0106953 A1* | 4/2010 | Morad et al. | 713/2 |
| 2010/0122076 A1* | 5/2010 | Witty | 713/2 |
| 2010/0306399 A1* | 12/2010 | Khosravi et al. | 709/231 |
| 2011/0083006 A1* | 4/2011 | Maruyama et al. | 713/2 |
| 2011/0131447 A1* | 6/2011 | Prakash et al. | 714/19 |

OTHER PUBLICATIONS

"TCG Storage Application Note: Encrypting Drives Compliant with Opal SSC", Specification Version 1.00, Final Revision 1.00, Feb. 19, 2010, pp. ii-92.

International Search Report and Written Opinion for PCT/IB2011/001748, dated Nov. 29, 2011, 9 pages.

JEDEC Standard, Mar. 2009, pp. 33-40, retrieved from http://www.jedec.org/sites/default/files/docs/JESD84-A441_0.pdf, retrieved on Nov. 9, 2011.

Micron Technical Note: Booting from Embedded MMC, TN-29-18, 16 pages, 2006.

SanDisk iNAND™ eSD/eMMC Embedded Flash Drive, 2 pages, 2008.

Trusted Boot: Verifying the Xen Launch, Joseph Cihula, Intel Corp., Fall 2007 Xen Summit, 12 pages, 2007.

CE Linux Forum, Trusted Boot Loader, Steve Johnson, 37 pages, Apr. 12, 2006.

* cited by examiner

HOST DEVICE AND METHOD FOR SECURELY BOOTING THE HOST DEVICE WITH OPERATING SYSTEM CODE LOADED FROM A STORAGE DEVICE

BACKGROUND

In some environments, a host device (such as a mobile phone or other device) is used with an embedded or removable storage device (such as a Secure Digital (SD) card or a MultiMedia Card (MMC)) that stores the operating system code for the host device, as well as boot loader code. To boot the host device, the host device instructs the storage device to initiate a boot mode, in response to which the storage device provides the host device with the boot loader code. Executing the boot loader code enables the host device to load the operating system code from the storage device. In some mobile device environments, the instruction to initiate the boot mode is not a standard command that the host device would send in its typical read/write communications with the storage device. For example, under the Joint Electron Devices Engineering Council's (JEDEC's) JESD84-A44 standard and under Micron's TN-29-18 specification, a host device can instruct the storage device to initiate a boot mode by holding a command line to the storage device low for 74 clock cycles or by sending a CMD 0 command with the argument 0xFFFFFFFA.

Because the operating system code is stored on the storage device, it is possible that a hacker can alter the operating system code without knowledge of the host device to introduce malware. Accordingly, in some environments, it is desired to verify the integrity of the operating system code before it is executed by the host device. To perform such a "secure boot," the host device's controller can include secure read-only memory (ROM) code or other features to verify the operating system code before it is executed. However, provisioning a controller with such verification code increases the controller's cost, and controllers that are initially manufactured without the verification code usually cannot be retrofitted to include the verification code after manufacturing.

OVERVIEW

Embodiments of the present invention are defined by the claims, and nothing in this section should be taken as a limitation on those claims.

By way of introduction, the below embodiments relate to a host device and method for securely booting the host device with operating system code loaded from a storage device. In one embodiment, a host device is in communication with a storage device having a private memory area storing boot loader code and a public memory area storing operating system code. The host device instructs the storage device to initiate a boot mode and receives the boot loader code from the storage device. The host device executes the boot loader code which performs a security check and executes the operating system code loaded from the storage device only if the security check is successful.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the below embodiments relate to a host device and method for securely booting the host device with operating system code loaded from a storage device. With the embodiments described below, boot loader code stored in a storage device is configured to not only enable a host device to load the operating system code, but also to perform a security check. In this way, the boat loader can enable the host device to execute the operating system code loaded from the storage device only if the security check is successful. The security check can take any suitable form. For example, the security check can attempt to verify the integrity of the operating system code to ensure that the operating system code was not altered by a hacker to introduce malware. This provides a "secure boot" without the expense or inflexibility associated with provisioning the host device's controller with such functionally. Other examples of security checks that can be performed include, but are not limited to, attempting to authenticate a user of the host device, attempting to authenticate the host device, and attempting to authenticate a Subscriber Identity Module (SIM) card used with the host device. Before turning to these security checks, the following section describes exemplary host and storage devices.

Exemplary Host and Storage Devices

Figure 1:
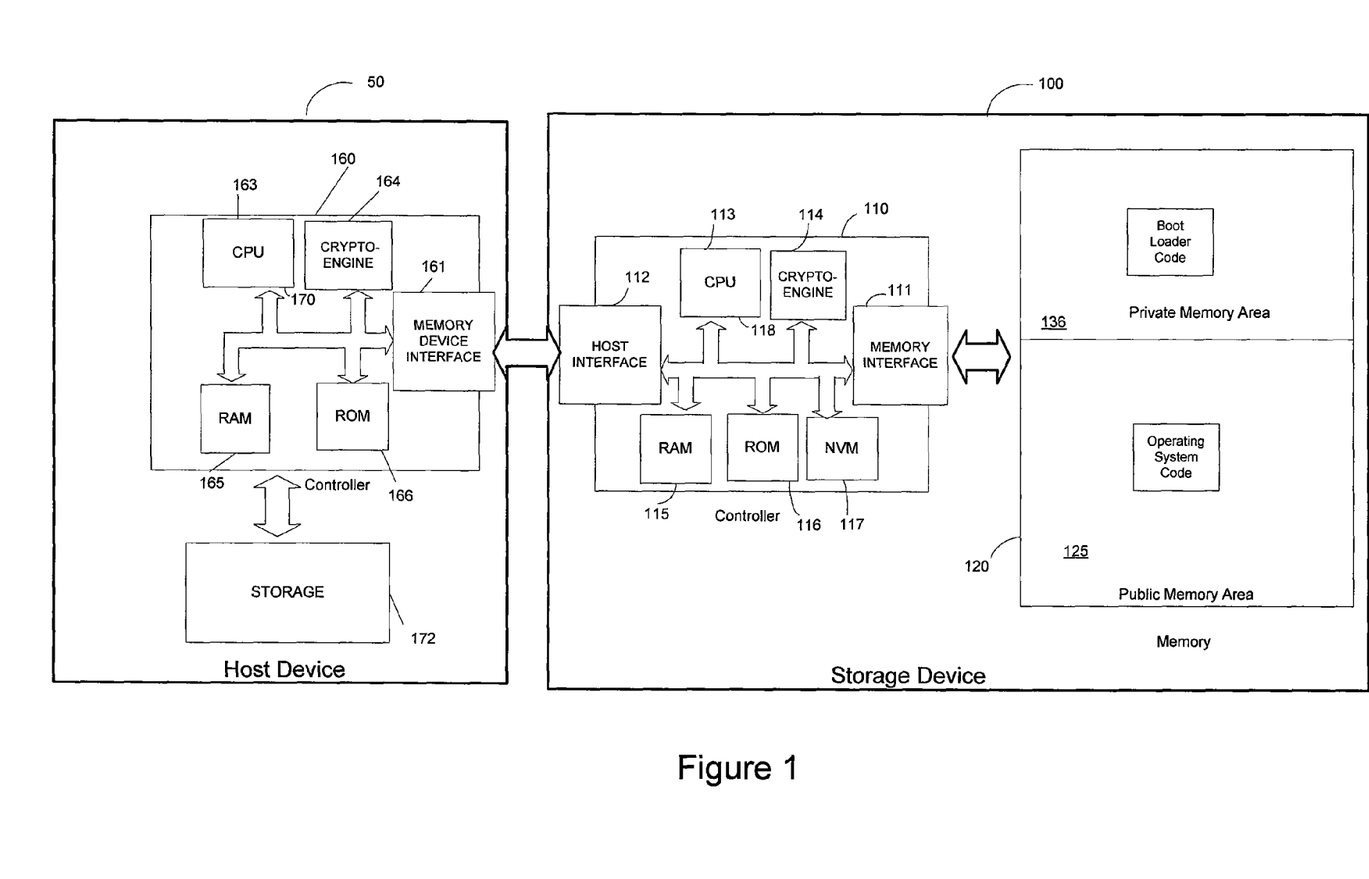
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, an embedded memory (e.g., a secure module embedded in the host device 50) and a handheld, removable memory card, as well as a universal serial bus (USB) device and a removable or non-removable hard drive (e.g., magnetic disk or solid-state drive). In one embodiment, the storage device 100 takes the form of an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, a hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/ decryption operations. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers ARC 625D, Atmel AT91SAM, Microchip PIC18F26K20, and Silicon Labs C8051F320.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In this embodiment, the memory 120 comprises a public memory area 125 that is managed by a file system on the host 50 and a private memory area 135 that is internally managed by the controller 110. The private memory area 135 can store boot loader code (as will be described below), as well as other data, including, but not limited to, content encryption keys (CEKs) and firmware (FW) code. The public memory area 125 can store operating system code for the host device 50 (as will be described below), as well as user data and other data. The public memory area 125 and the private memory area 135 can be different partitions of the same memory unit or can be different memory units. The private memory area 136 is "private" (or "hidden") because it is internally managed by the controller 110 (and not by the host's controller 160). In one embodiment, the private memory area 136 is read only or not accessible after the boot process in order to prevent someone from overwriting or modifying the boot loader code. In addition to storing operating system code, the public memory area 125 can be used to store user data. Further, in one embodiment, the operating system code is stored in re-writable memory to allow updates to be written to the operating system code.

Turning now to the host 50, the host 50 comprises a controller 160 that has a storage device interface 161 for interfacing with the storage device 100. The controller 160 also comprises a central processing unit (CPU) 163, a crypto-engine 164 operative to provide encryption and/or decryption operations, read access memory (RAM) 165, read only memory (ROM) 166, a security module 171, and storage 172. The storage device 100 and the host 150 communicate with each other via a storage device interface 161 and a host interface 112. For operations that involve the secure transfer of data, it is preferred that the crypto-engines 114, 164 in the storage device 100 and host 150 be used to mutually authenticate each other and provide a key exchange. After mutual authentication is complete, it is preferred that a session key be used to establish a secure channel for communication between the storage device 150 and host 100. The host 50 can contain other components (e.g., a display device, a speaker, a headphone jack, a video output connection, etc.), which are not shown in FIG. 1 to simplify the drawings.

Overview of the Booting Process of the Host Device

Figure 2:
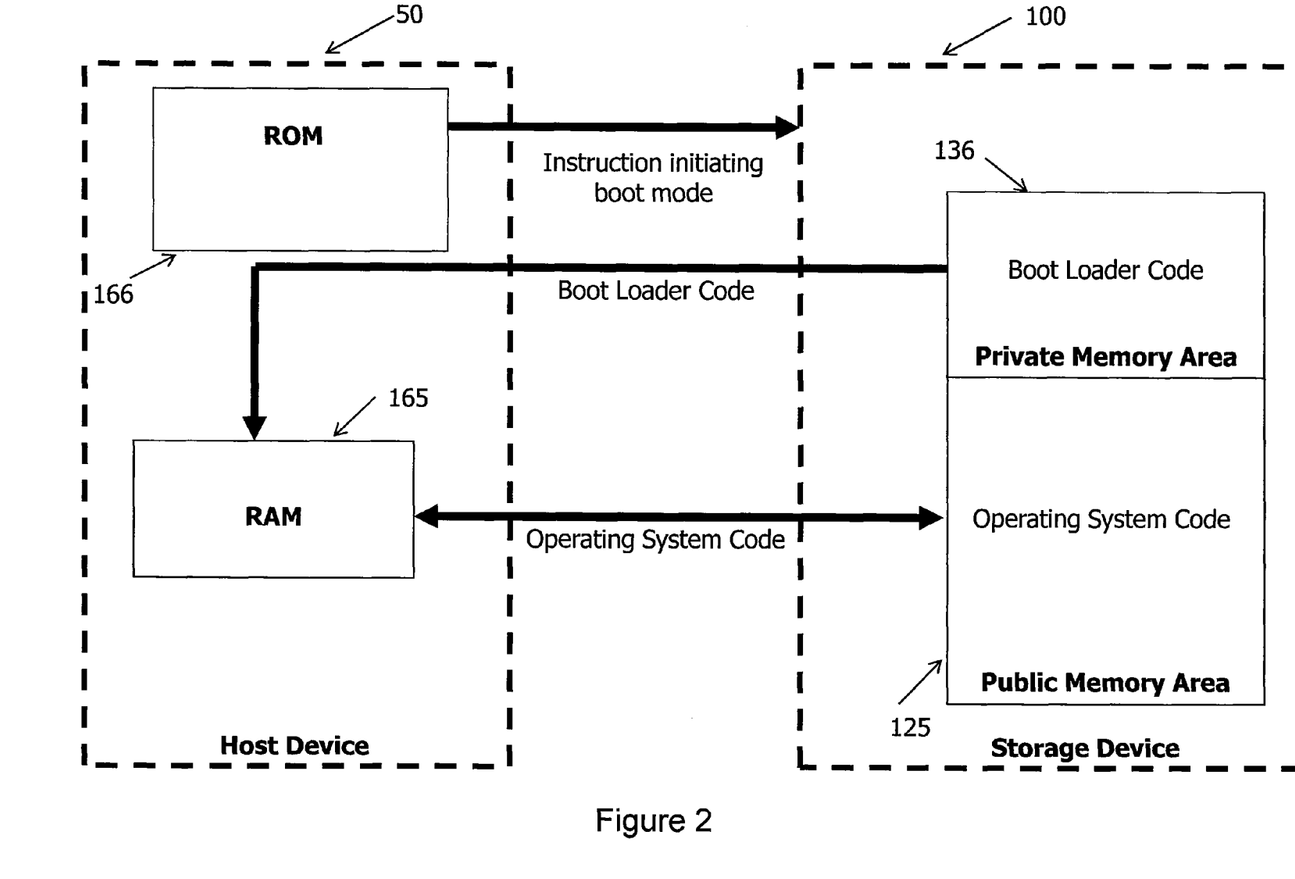
FIG. 2 is a block diagram of a host device and storage device that diagrammatically illustrates a boot process of an embodiment.

Returning to the drawings, FIG. 2 diagrammatically illustrates a boot process of an embodiment. In general, the host device's CPU 163 can only execute program code found in the host device's ROM 166 or RAM 165 (FIG. 1). When the host device 50 is first powered up, it does not have an operating system in ROM 166 or RAM 165. However, the host device 50 does have a small program stored in ROM 166, which the CPU 163 can execute to send an instruction to the storage device 100 to initiate a boot mode. In response to this instruction, the storage device 100 sends boot loader code to the host device 100 to be stored in the host device's RAM 165 and executed by its CPU 163. This process of copying the boot loader code into the host device's RAM 165 for execution is sometimes referred to as "shadowing the image." Boot loader code (which is sometimes referred to as a boot loader image, a bootstrap loader, or a bootstrap loader image) is computer-readable program code that, when executed, enables the host device 50 to read the operating system code from the public memory area 125 of the storage device 100 and thereafter execute the operating system code, thereby booting up the host device 50.

As mentioned above, in this embodiment, the boot loader code is stored in the private memory area 136 of the storage device 100 (preferably, in a read-only manner to ensure the integrity of the boot loader code against tampering). As also mentioned above, the private memory area 136 is managed internally by the storage device 100 and not by the host device 50. Accordingly, the instruction to the storage device 100 to initiate a boot mode is not a standard command to read from an address in the storage device 100. This is in contrast to some personal computer (PC) and other environments, which send a standard read command of logical address zero to read boot loader code stored in the PC's hard drive. Further, sending of the boot loader code to the host device 50 is in response to receiving the special instruction from the host device 50 and being in a boot mode—it is not in response to a standard read command of a logical address from the host device 50, as in some PC environments.

The instruction to the storage device 100 to initiate the boot mode can take any suitable form. For example, the Joint Electron Devices Engineering Council's (JEDEC's) JESD84-A44 standard and Micron's TN-29-18 specification define an MultiMediaCard (MMC) embedded memory interface/protocol for a host device to load boot loader code from a storage device directly without the need for issuing read/ write storage commands (e.g., standard MultiMediaCard commands). The JEDEC standard and the Micron specification describe two suitable instructions to initiate the boot mode in a storage device. These exemplary instructions will be discussed in conjunction with FIGS. 3-5.

Figure 3:
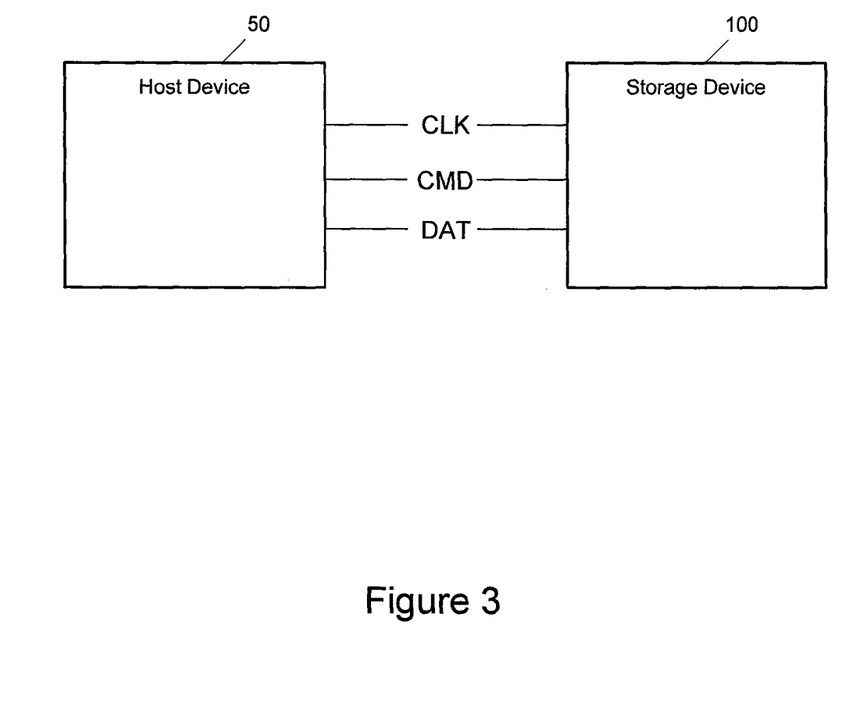
FIG. 3 is a block diagram illustrating an interface between a host device and a storage device of an embodiment.
Figure 4:
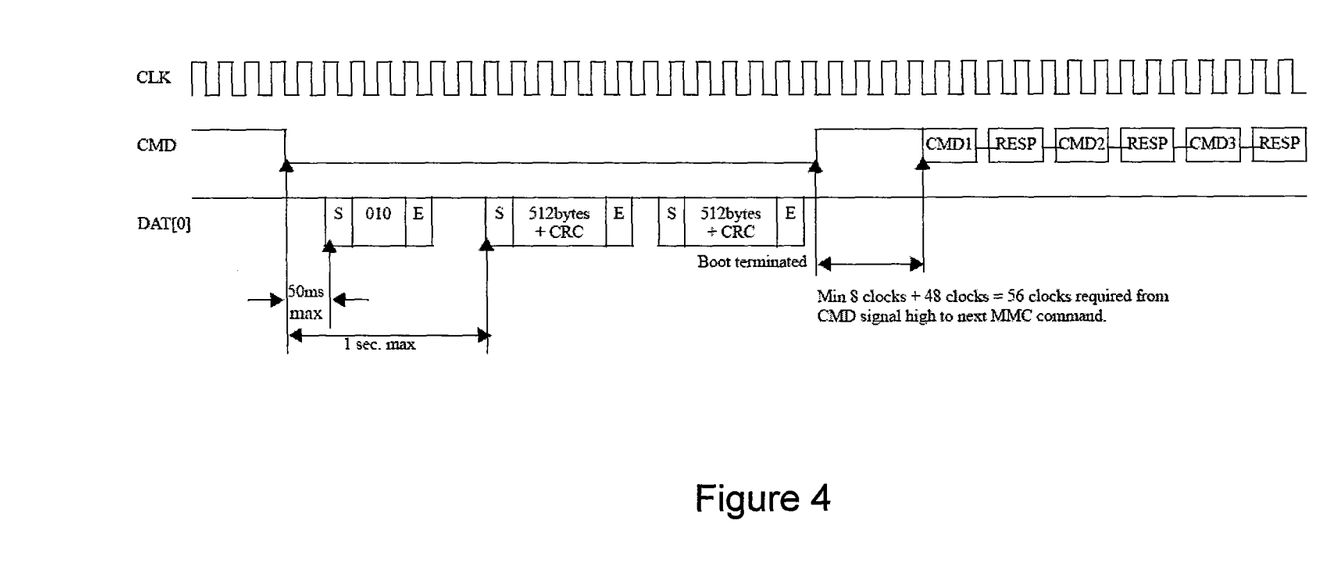
FIG. 4 is a diagram illustrating an instruction of an embodiment for initiating a boot mode.

FIG. 3 is a block diagram illustrating an interface between the host device 50 and the storage device 100. As shown in FIG. 3, the interface in this embodiment has a clock (CLK) line, one or more command (CMD) lines, and one or more data (DAT) lines, which can take the form of pins on a bus. A signal on the CLK line synchronizes data between the host device 50 and the storage device 100. The CMD line transfers commands from the host device 50 and the storage device 100 and transfers responses from the storage device 100 back to the host device 50. The DAT line is used to transfer data between the storage device 100 and the host device 50.

In one embodiment (shown in FIG. 4), the instruction to the storage device 100 to initiate a boot mode takes the form of holding the CMD line low for 74 clock cycles. The storage device 100 recognizes this as an instruction to initiate the boot mode and starts to send the first boot data to the host device 50 on the DAT line(s). The host device 50 would keep the CMD line low to read all of the boot data. If boot acknowledge is enabled, the storage device 100 sends acknowledge pattern "010" to the host device 50 within 50 ms after the CMD line goes low. In contrast, if boot acknowledge is disabled, the storage device 100 will not send out acknowledge pattern "010."

In another embodiment (shown in FIG. 5), the instruction to the storage device 100 to initiate a boot mode takes the form of sending a CMD 0 command with argument 0xFFFFFFFA on the CMD line after 74 clock cycles following power-up/reset and before CMD 1 is issued or the CMD line goes low. The storage device 100 will recognize this as an instruction to initiate boot mode and start preparing boot data internally. Within one second after CMD 0 with the argument of 0xFFFFFFFA is issued, the storage device 100 starts to send the first boot data to the host device 50 on the DAT line(s). If boot acknowledge is enabled, the storage device 100 sends the acknowledge pattern "010" to the host device 50 within 50 ms after the CMD0 with the argument 0xFFFFFFFA is received. In contrast, if boot acknowledge is disabled, the storage device 100 will not send out acknowledge pattern "010." The host device 50 can terminate boot mode by issuing CMD0 (Reset).

Figure 5:
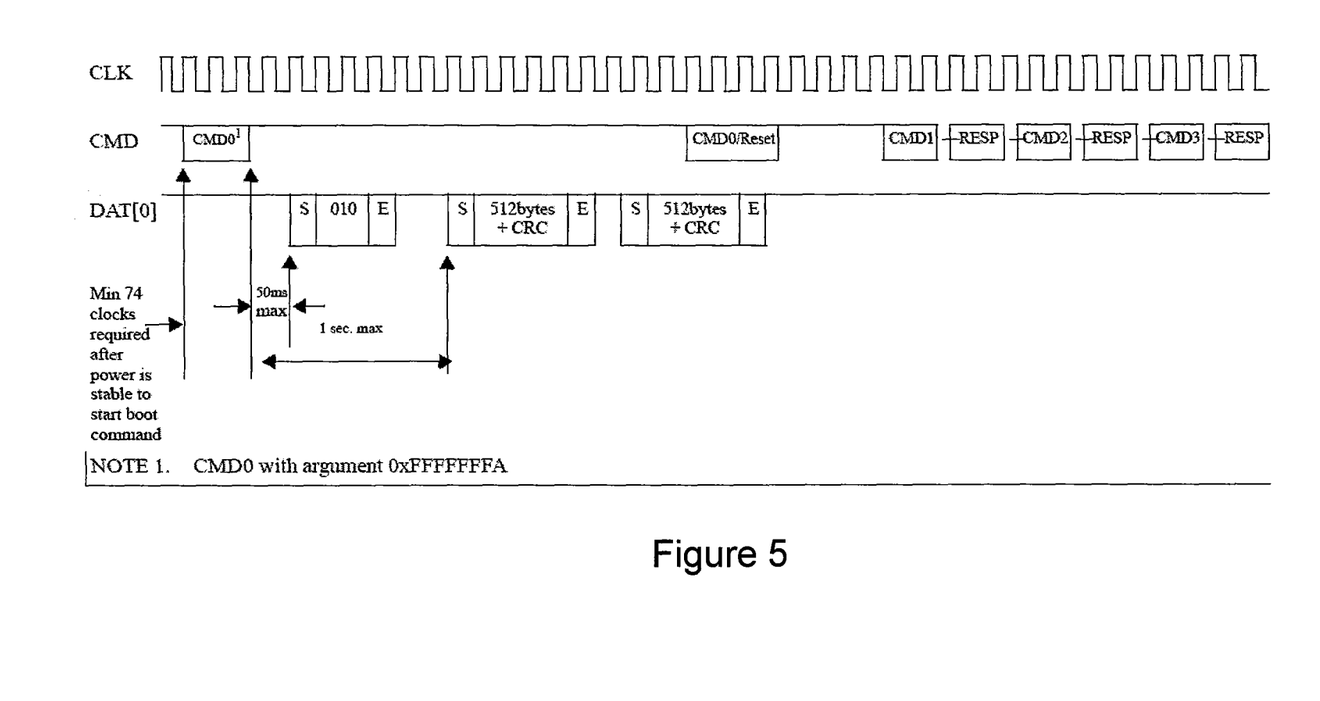
FIG. 5 is a diagram illustrating an instruction of another embodiment for initiating a boot mode.

As mentioned above, these instructions are not commands to read data stored at an address. Rather, they are special instructions that cause the storage device 100 to initiate a boot mode to send the boot loader code to the host device 50. After the boot loader code is sent to the host device 50, the host device 50 executes the boot loader code to load the operating system code from the public memory area 125 of the storage device 100. In this embodiment, the process of loading the operating system code from the public memory area 125 of the storage device 100 can be performed using standard read commands.

Exemplary Security Features of the Boot Loader Code

As mentioned in the background section above, because the operating system code is stored in the storage device 100, it is possible that a hacker can alter the operating system code without knowledge of the host device 50 to introduce malware. Accordingly, in some environments, it is desired to verify the integrity of the operating system code before it is executed by the host device 50. While the host device's ROM can be provisioned with code to verify the integrity of the operating system code, this increases the controller's cost. Also, because such provisioning must be done at the manufacturing stage, host device controllers that are initially manufactured without the verification code cannot be retrofitted to include the verification code after manufacturing. To overcome these problems, in one embodiment, the boot loader code stored in the storage device 100 is configured to attempt to verify the integrity of the operating system code and only enable the host device 50 to load and execute the operating system code only if the attempt to verify the integrity of the operating system code is successful. This embodiment will be illustrated in conjunction with FIG. 6.

Figure 6:
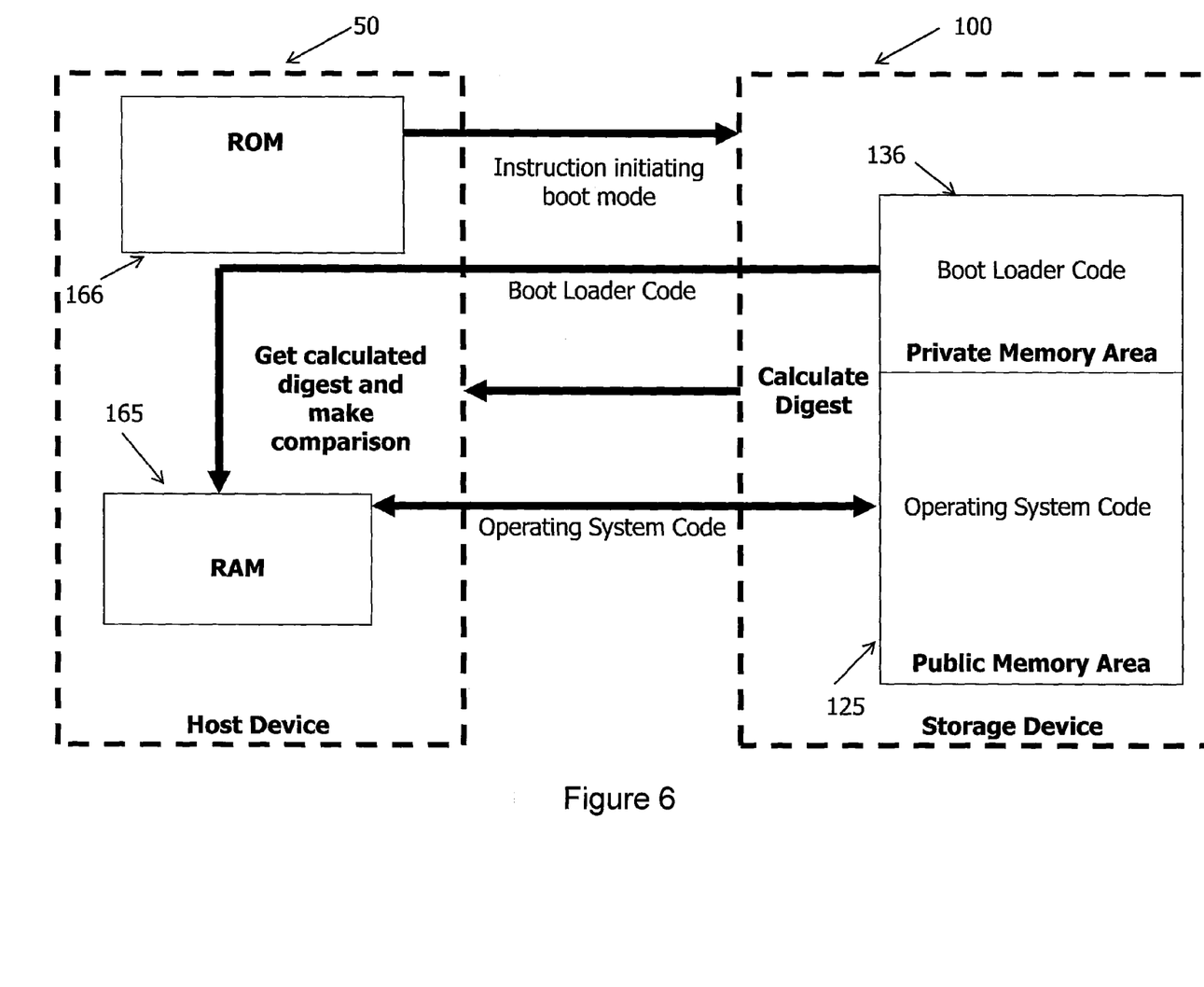
FIG. 6 is a block diagram of a host device and storage device that diagrammatically illustrates a boot process of an embodiment that involves a security check.

As shown diagrammatically in FIG. 6, the host device 50 sends an instruction to the storage device 100 to initiate boot mode and, in response to that instruction, receives and executes the boot loader code. In this embodiment, the boot loader code includes a reference image verification code, such as a hash value of the operating system code (i.e., the operating system code digest). (Since the boot loader code is stored in read-only memory in the storage device 100, the stored reference image verification code cannot be altered.) The boot loader in this embodiment is also configured to initialize a special read mode to instruct the storage device 100 to calculate a digest of all read data. In this way, as the boot loader is reading the operating system code from the storage device 100, the storage device's controller will calculate a digest of all read data on the fly (e.g., using Hash-based Message Authentication Code (HMAC)). Using the storage device 100 to calculate the digest instead of the host device 50 avoids degrading performance of the host device 100 during the booting process. After the host device 50 finishes reading the operating system code from the storage device 100, the boot loader receives the calculated digest from the storage device 100 and compares the calculated digest with the reference digest stored in boot loader. If the digest comparison is positive (i.e., if the security check is successful), the host device 50 can execute the operating system code. (Instead of using a digest comparison, the calculated digest can be used for signature verification.) Because the verification of the integrity of the operating system is performed by the boot loader and storage device 100 and not by code provisioned in the host device's controller during manufacturing of the host device 50, this embodiment provides the desired "secure boot" feature without the expense or inflexibility associated with provisioning the host device's controller with such functionally.

While the security check in the above example attempted to verify the integrity of the operating system, it should be noted that the boot loader can be configured to provide additional or alternative security checks. For example, because the operating system code is stored in the public memory area 125, it may be desirable to implement some form of access control over the public memory area 125, so that the operating system code cannot be executed unless a successful security check is performed by the boot loader. Accordingly, the storage device 100 can be designed to allow access to the operating system code only if the host device 100 presents the proper credentials to the storage device 100, and those proper credentials can be generated by the boot loader upon completion of a successful security check. In such an embodiment, the boot loader can contain an application program interface (API) to enable communication with a special security software stack in the storage device 100 that is responsible for authentication and access control functions. This embodiment is illustrated in the flow diagram of FIG. 7 and is discussed below.

Figure 7:
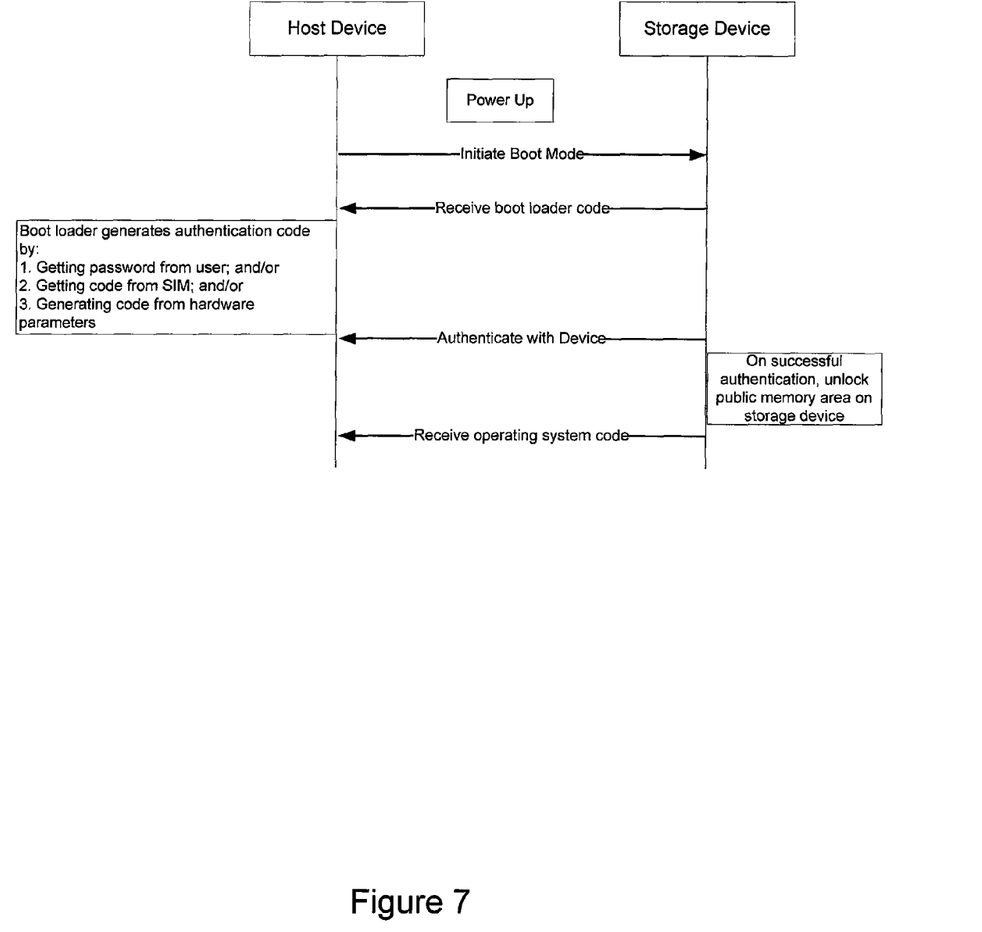
FIG. 7 is a flow diagram of a boot process of an embodiment that involves a security check.

As shown in FIG. 7, the host device 100 can generate the proper credential to authenticate to the storage device 100 upon a successful attempt to authenticate a user of the host device, upon a successful attempt to authenticate the host device, and/or upon a successful attempt to authenticate a Subscriber Identity Module (SIM) card used with the host device. Each of these security checks will now be described. Of course, different security checks or variations of these security checks can be used.

In one embodiment, the boot loader is configured to attempt to authenticate a user of the host device 50. In this embodiment, the user can be required to enter a password that will be provided to the storage device 100 in order to enable access to data stored on the storage device 100. This password authentication can be implemented using proprietary techniques defined by specific applications or can be implemented using other techniques such as those used by TrustedFlash™ memory products by SanDisk Corporation and by PCs operating in the Trusted Computing Group (TCG) environment. If a user is authenticated by the boot loader running on the host device 50, the appropriate credential is sent to the storage device 100 to unlock the public memory area 25 and provide access to the operating system code stored therein, so that the operating system code can be loaded and executed.

In another embodiment, the boot loader code is configured to attempt to authenticate the host device 50, which, in effect, binds the operating system code to a particular host device. In this embodiment, the boot loader code collects various hardware parameters of the host device 50 can calculate a digest. Examples of hardware parameters include, but are not limited to, a unique hardware identifier, a memory size, a Media Access Control (MAC) address, and a controller version. The calculated digest is then compared to a digest value stored in the boot loader. If the calculated digest matches the stored digest, the security check is successful, and the appropriate instruction is sent to the storage device 100 to unlock the public memory area 25 and provide access to the operating system code stored therein, so that the operating system code can be loaded and executed. In yet another embodiment, the boot loader code can be configured to attempt to authenticate a Subscriber Identity Module (SIM) card used with the host device 50. This embodiment is similar to the one discussed above, but the hardware parameters are of the SIM card (e.g., an International Mobile Subscriber Identity (IMSI) identifier and an International Mobile Equipment Identity (IMEI) identifier). In this way, the operating system code would be bound to the SIM card—and not to the host device 50. Of course, if the digest is calculated from hardware parameters of both the host device 50 and the SIM card, the operating system code would be bound to both the host device 50 and the SIM card. The host device 50 can also perform SIM card—host device authentication to generate authentication code for unlocking the storage device 100 (e.g., using a challenge response PKI scheme or using symmetric or password authentication).

There are several alternatives that can be used with these embodiments. For example, instead of a single operating system code, the storage device 100 can store a plurality of operating system codes, and the user can be asked which of these codes to upload during the boot process. As another alternative, the boot loader can run a purchasing application that allows the user to purchase a particular operating system code or other content. As yet another alternative, the boot loader can allow an operating system upgrade at a lower level via a boot loader upgrade.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for securely booting a host device with operating system code loaded from a storage device, the method comprising:
 performing in a host device in communication with a storage device having a private memory area storing boot loader code and a public memory area storing operating system code:
  instructing the storage device to initiate a boot mode;
  receiving the boot loader code from the storage device; and
  executing the boot loader code, wherein, when executed, the boot loader code:
   performs a security check, and
   executes the operating system code loaded from the storage device only if the security check is successful.

2. The method of claim 1, wherein the host device instructs the storage device to initiate the boot mode other than by sending a command to read from an address in the storage device.

3. The method of claim 1, wherein the host device and the storage device communicate over an interface that comprises a command (CMD) line, and wherein the host device instructs the storage device to initiate the boot mode by holding the CMD line low for 74 clock cycles.

4. The method of claim 1, wherein the host device and the storage device communicate over an interface that comprises a command (CMD) line, and wherein the host device instructs the storage device to initiate the boot mode by sending, on the CMD line, a CMD 0 command with argument 0xFFFFFFFA.

5. The method of claim 1, wherein the security check is performed by attempting to verify the integrity of the operating system code.

6. The method of claim 1, wherein the security check is performed by attempting to authenticate a user of the host device.

7. The method of claim 6, wherein attempting to authenticate the user of the host device comprising requesting a user password.

8. The method of claim 1, wherein the security check is performed by attempting to authenticate the host device.

9. The method of claim 7, wherein attempting to authenticate the host device comprises authenticating a hardware parameter of the host device.

10. The method of claim 1, wherein the host device is further in communication with a Subscriber Identity Module (SIM) card, and wherein the security check is performed by attempting to authenticate the SIM card.

11. The method of claim 1, wherein the storage device comprises a storage device embedded in the host device.

12. The method of claim 1, wherein the storage device comprises a storage device removably connectable to the host device.

13. The method of claim 1, wherein the security check is performed by the boot loader code received from the storage device and not by code provisioned in the host device's controller during manufacturing of the host device.

14. A host device comprising:
 an interface configured to communicate with a storage device having a private memory area storing boot loader code and a public memory area storing operating system code; and
 a controller in communication with the interface, wherein the controller is configured to:
  instruct the storage device to initiate a boot mode;
  receive the boot loader code from the storage device; and
  execute the boot loader code, wherein, when executed, the boot loader code:
   performs a security check, and
   executes the operating system code loaded from the storage device only if the security check is successful.

15. The host device of claim 14, wherein the controller is configured to instruct the storage device to initiate the boot mode other than by sending a command to read from an address in the storage device.

16. The host device of claim 14, wherein the interface comprises a command (CMD) line, and wherein the controller is configured to instruct the storage device to initiate the boot mode by holding the CMD line low for 74 clock cycles.

17. The host device of claim 14, wherein the interface comprises a command (CMD) line, and wherein the controller is configured to instruct the storage device to initiate the boot mode by sending, on the CMD line, a CMD 0 command with argument 0xFFFFFFFA.

18. The host device of claim 14, wherein the security check is performed by attempting to verify the integrity of the operating system code.

19. The host device of claim 14, wherein the security check is performed by attempting to authenticate a user of the host device.

20. The host device of claim 14, wherein the security check is performed by attempting to authenticate the host device.

21. The host device of claim 14 further comprising a Subscriber Identity Module (SIM) card in communication with the controller, and wherein the security check is performed by attempting to authenticate the SIM card.

22. The host device of claim 14, wherein the storage device comprises a storage device embedded in the host device.

23. The host device of claim 14, wherein the storage device comprises a storage device removably connectable to the host device.

24. The host device of claim 14, wherein the security check is performed by the boot loader code received from the storage device and not by code provisioned in the host device's controller during manufacturing of the host device.

* * * * *